United States Patent Office 3,558,705
Patented Jan. 26, 1971

3,558,705
2,2,2-TRICHLORO-ETHYLIDENANILINES
Hans-Georg Schmelzer, Cologne-Stammheim, Eberhart Degener, Leverkusen, Gunter Unterstenhofer, Opladen, Horst Tarnow, Leverkusen, and Ingeborg Hammann, Cologne, Germany, assignors to Farbenfabriken Bayer Aktiengesellschaft, Leverkusen, Germany, a corporation of Germany
No Drawing. Filed Oct. 25, 1967, Ser. No. 677,878
Claims priority, application Germany, Oct. 28, 1966, F 50,561
Int. Cl. C07c 119/00
U.S. Cl. 260—566                                  10 Claims

ABSTRACT OF THE DISCLOSURE

N-(2,2,2-trichloro-ethylidene)-anilines which possess acaricidal properties and which may be produced by reacting the corresponding sulfinylanilines with chloral.

The present invention relates to and has for its objects the provision for particular new N-(2,2,2-trichloroethylidene)-anilines which possess acaricidal properties, active compositions in the form of mixtures of such compounds with solid and liquid dispersible carrier vehicles, and methods for producing such compounds and for using such compounds in a new way especially for combatting acarids, with other and further objects becoming apparent from a study of the within specification and accompanying examples.

It is known that phosphoric acid esters, for example O,O-dimethyl-S - (ethylmercaptoethyl) - thiolphosphoric acid ester (A), can be used as acaricidally active compounds. Recently, however, a decline in the effectiveness of such esters has become noticeable because the mites are becoming ever more resistant.

It has been found, in accordance with the present invention, that the particular new N-(2,2,2-trichloro-ethylidene)-anilines having the formula

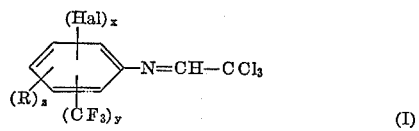

(I)

in which each Hal respectively is selected from the group consisting of chloro, bromo and fluoro, each R respectively is selected from the group consisting of lower alkyl and cyano, $x$ is a whole number from 0 to 5, $y$ is a whole number from 0 to 2, and $z$ is a whole number from 0 to 3, with the proviso that the sum of $x$ and $y$ is at least 1 and at most 5 and that the sum of $x$, $y$ and $z$ is at most 5, exhibit strong acaricidal properties.

It has been furthermore found, in accordance with the present invention, that a versatile and smooth process for the production of the particular new N-(2,2,2-trichloroethylidene)-aniline of Formula I above in favorable yields may be provided, which comprises reacting sulfinylanilines having the formula

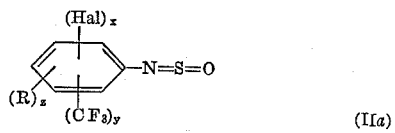

(IIa)

in which Hal, R, $x$, $y$ and $z$ are the same as defined above, with chloral of the formula

(IIb)

optionally in the presence of a solvent and optionally in the presence of a catalyst, sulfur dioxide being split off.

It is very surprising that the particular new N-(2,2,2-trichloro-ethylidene)-anilines of the present invention have a higher acaricidal potency than, for example, the previously known O,O-dimethyl-S - (ethylmercaptoethyl)-thiolphosphoric acid ester (A).

For example, when 2,3,4,6-tetrachloro-sulfinylaniline is used as starting material, the course of the reaction can be represented by the following equation:

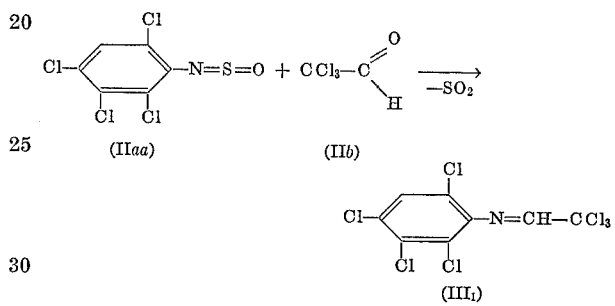

The starting materials are clearly characterized by the above Formulae IIa and IIb.

As examples of the sulfinylanilines of Formula IIa which can be used according to the present invention, the following list may be set forth:

2-, 3- and 4-chloro-sulfinylaniline,
2,3-, 2,4-, 2,5-, 3,4- and 3,5-dichloro-sulfinylaniline,
2,3,4-, 2,3,5-, 2,3,6-, 2,4,5-, 2,4,6,- and 3,4,5,-trichloro-sulfinylaniline,
2,3,5,6-, 2,3,4,6- and 2,3,4,5-tetrachloro-sulfinylaniline,
pentachloro-sulfinylaniline,
2,4- and 3,4-difluoro-sulfinylaniline,
2,4,6-trifluoro-sulfinylaniline,
2-chloro-5-fluoro-sulfinylaniline,
3,5-dichloro-4-fluoro-sulfinylaniline,
2,3,5,6-tetrachloro-4-fluoro-sulfinylaniline,
2-fluoro-4-bromo-sulfinylaniline,
2,4,6-trimethyl-3-fluoro-sulfinylaniline,
2-methyl-3-chloro-, 2-methyl-4-chloro-, 2-methyl-5-chloro- and 2-methyl-6-chloro-sulfinylaniline,
3-methyl-4-chloro- and 3-methyl-6-chloro-sulfinylaniline,
4-methyl-2-chloro-sulfinylaniline,
2,4-dichloro-5-methyl-sulfinylaniline,
3- and 4-bromo-sulfinylaniline,
2,4,6-tribromo-sulfinylaniline,
2-methyl-5-bromo-sulfinylaniline,
2,4-dimethyl-6-bromo-sulfinylaniline,
2,6-dibromo-4-methyl- and 2,4-dibromo-6-methyl-sulfinylaniline,
2,4-dibromo-6-chloro- and 2,6-dibromo-4-chloro-sulfinylaniline, 3,5-bis-(2-trifluoromethyl)sulfinylaniline.,
2-trifluoromethyl-4-chloro- and 3-trifluoromethyl-6-chloro-sulfinylaniline,
2-trifluoromethyl-4-cyano-sulfinylaniline,
2,6-dichloro-4-canyo- sulfinylaniline,
2,3,5,6-tetrachloro-4-cyano-sulfinylaniline,
3-bromo-4-tert.-butyl-sulfinylaniline and
2,3,5-trichloro-4,6-dicyano-sulfinylaniline.

The sulfinylanilines to be used in accordance with the present invention are in part already known.

Those which are not yet known can be prepared in the same manner as those already known, expediently by heating of the anilines with thionyl chloride under reflux.

The reaction for producing the particlular new active compounds of the present invention is expediently carried out in the presence of a solvent or diluent. For this purpose, an excess of chloral is quite particularly suitable. However, other diluents may also be used which are inert with respect to the reactants. These include hydrocarbons, such as petroleum ether, benzene, toluene and xylene; chlorinated hydrocarbons, such as carbon tetrachloride, 1,1,2,2-tetrachloroethane, chlorobenzene, o-dichlorobenzene and α-chloronaphthalene; ethers, such as dioxan; ketones, such as methylisobutyl ketone; and esters, such as glycolmonomethyl ether acetate and glycolmonoethyl ether acetate; and the like.

The reaction in accordance with the present invention can be accelerated by addition of catalysts of the Lewis acid type. As examples of such catalysts there may be mentioned: boron trifluoride as diethyletherate or dibutyletherate, anhydrous aluminum chloride, iron (III) chloride and tin (IV) chloride, and the like.

The reaction temperatures can be varied within a fairly wide range. In general, the process is carried out at from about 50 to 200° C., preferably from 80 to 120° C.

When carrying out the instant process, at least 1 mol of chloral is used per mol of sulfinylaniline. The catalysts are used in amounts of 0.01 to 5% by weight, with reference to the reaction mixture.

Most expediently, an excess of chloral is used and the reaction mixture is boiled under reflux, sulfur dioxide being split off. After the reaction has been completed, the excess of chloral or other solvent is distilled off and the reaction product is purified by distillation or recrystallization. In general, the crude products already possess a very high purity. The yields are in many cases practically quantitative.

Advantageously, the particular new active compounds of the present invention exhibit strong acaricidal activities, with low toxicity to warm-blooded animals and low phytotoxicity. The effects set in rapidly and are long-lasting. The instant active compounds can therefore be used with good results for the control of mites (Acarina), especially those which are already more or less resistant to phosphoric acid esters.

In the case of mites, particularly important are the spider mites (*Tetranchidae*), such as the two-spotted spider mite (*Tetranychus urticae*), the European red mite (*Paratetranychus pilosus*); blister mites, such as the current blister mite (*Eriophyes ribis*) and tarsonemids, such as *Tarsonemus pallidus*; and ticks; and the like.

The particular active compounds to be used according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of the carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), ethers, ether-alcohols (for instance, glycol monomethyl ether, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonate, aryl sulfonate, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agents, such as other insecticides, fungicides, herbicides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001 and 5%, preferably 0.01 and 0.5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.001 and 95%, and preferably 0.01 and 95%, by weight of the mixture.

Furthermore, the present invention contemplates methods of selectively controlling or combatting acarids, which comprises applying to at least one of (a) such acarids and (b) their habitat, i.e., the locus to be protected, a combative amount, i.e., an acaricidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The acaricidal activity of the instant compounds is illustrated, without limitation, by the following example:

EXAMPLE 1

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of such active compound is determined by counting the dead mites. The degree of destruction thus obtained is expresed as a percentage: 100% means that all the spider mites are killed whereas 0% means that none of the spider mites are killed.

The particular active compounds, the concentrations of such active compounds, the evaluation time and the results obtained can be seen from the following Table 1:

TABLE 1.—PLANT-DAMAGING MITES

| Active compound | Concentration of active compound, in percent | Degree of destruction in percent, after 8 days |
|---|---|---|
| (A) $CH_3O\!\!-\!\!\overset{O}{\underset{CH_3O}{P}}\!\!-\!\!S\!-\!CH_2\!-\!CH_2\!-\!S\!-\!C_2H_5$ (known) | 0.1<br>0.05<br>0.02<br>0.01<br>0.004 | 75<br>60<br>0<br>0<br>0 |
| (III₂) Cl—[2,4,6-tri-Cl-phenyl]—N=CH—CCl₃ | 0.1<br>0.05<br>0.02<br>0.004 | 100<br>100<br>98<br>50 |
| (IV₁) Cl—[2,3,5,6-tetra-Cl-phenyl]—N=CH—CCl₃ | 0.1<br>0.02<br>0.004 | 95<br>95<br>50 |
| (V₁) [2,4-di-Cl-phenyl]—N=CH—CCl₃ | 0.1<br>0.02 | 80<br>50 |
| (VI₁) Cl—[2,3-di-Cl-phenyl]—N=CH—CCl₃ | 0.1<br>0.02<br>0.004 | 80<br>50<br>50 |
| (VII₁) [2-Cl-phenyl]—N=CH—CCl₃ | 0.1<br>0.02 | 80–95<br>50 |
| (VIII₁) Cl—[2,5-di-Cl-phenyl]—N=CH—CCl₃ | 0.1<br>0.02 | 80<br>50 |
| (IX₁) Cl—[3-Cl-phenyl]—N=CH—CCl₃ | 0.1<br>0.02 | 70<br>50 |

The process for producing the instant compounds in accordance with the present invention is illustrated, without limitation, by the following further examples.

EXAMPLE 2

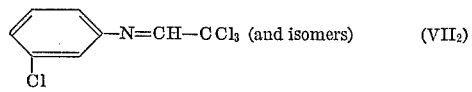

87 g. (0.5 mol) 3-chloro-sulfinylaniline are heated under reflux with 150 g. anhydrous chloral until the cessation of evolution of sulfur dioxide. The excess chloral is then distilled off and the residue is fractionated in a vacuum. At 123–125° C./0.4 mm. Hg there are obtained 113 g. (88% of the theory) of N-(2′,2′,2′-trichloro-ethylidene)-3-chloro-aniline as a pale yellow oil of refractive index $n_D^{20}$=1.5890.

From 87 g. (0.5 mol) 2-chloro-sulfinylaniline there is obtained in corresponding manner, at 117° C./0.2 mm. Hg and in practically quantitative yield, N-(2′,2′,2′-trichloro-ethylidene)-2-chloro-aniline (X₁) of refractive index $n_D^{20}$=1.5835 and from 87 g. (0.5 mol) 4-chloro-sulfinylaniline there are obtained, at 117–121° C./0.1 mm. Hg, 125 g. (97% of the theory) of N-(2′,2′,2′-trichloro-ethylidene)-4-chloro-aniline (XI₁) as a yellow oil of refractive index $n_D^{20}$=1.5932.

The preparation of the starting material is carried out as follows:

127.5 g. (1 mol) 3-chloro-aniline are introduced into 300 ml. thionyl chloride. The reaction mixture is heated under reflux until the cessation of evolution of gas. The excess thionyl chloride is then distilled off and the residue is fractionated in a vacuum. At 88–92° C./0.3 mm. Hg, 170 g. (98% of the theory) 3-chloro-sulfinylaniline are obtained as a yellow oil.

From 127.5 g. (1 mol) 2-chloro-aniline there are obtained, in corresponding manner, at 118–120° C./14 mm. Hg, 165 g. (95% of the theory) 2-chloro-sulfinylaniline, and from 127.5 g. (1 mol) 4-chloro-aniline there are obtained, at 117° C./15 mm. Hg, 165 g. (95% of the theory) 4-chloro-sulfinylaniline which solidifies in yellow crystals of M.P. 40° C.

EXAMPLE 3

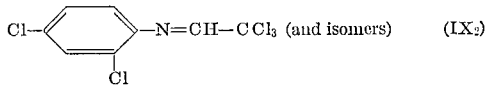

104 g. (0.5 mol) 2,4-dichloro-sulfinylaniline are heated under reflux in 150 g. anhydrous chloral until the cessation of evolution of sulfur dioxide. The residue remaining behind after the excess chloral has been distilled off is fractionated in a vacuum. At 127–130° C./0.2 mm. Hg, 129 g. (88% of the theory) of N-(2′,2′,2′-trichloro-ethylidene)-2,4-dichloro-aniline come over as a pale yellow oil.

In the same manner, the isomeric N-(2′,2′,2′-trichloro-ethylidene)-dichloro-anilines are obtained: N-(2′,2′,2′-trichloro-ethylidene)-3,4-dichloro-aniline (VI$_2$), B.P. 166° C./1 mm. Hg, yellow oil of refractive index $n_D^{20}$=1.6019 and N-(2′,2′,2′-trichloro-ethylidene)-3,5-dichloro-aniline (V$_2$), B.P. 158° C./1 mm. Hg, yellow oil of refractive index $n_D^{20}$=1.5918.

The preparation of the starting material was effected as follows:

162 g. (1 mol) 2,4-dichloro-aniline are heated under reflux in 200 ml. thionyl chloride until the cessation of evolution of gas. After the excess thionyl chloride has been distilled off there remains a crystalline residue which is recrystallized from white spirit. 2,4-dichloro-sulfinyl-aniline is obtained, in practically quantitative yield, as yellow crystals of M.P. 71° C.

In the same manner there are obtained 3,4-dichloro-sulfinyl-aniline, as yellow crystals of M.P. 78° C., and 3,5-dichloro-sulfinylaniline, as yellow crystals of M.P. 48° C.

EXAMPLE 4

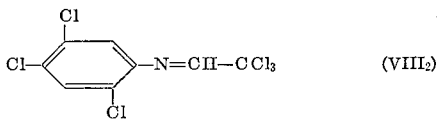

From 121 g. (0.5 mo) 2,4,5-trichloro-sulfinylaniline and 150 g. anhydrous chloral there are obtained, according to the method described in Example 3, 132 g. (81% of the theory) of N-(2′,2′,2′-trichloro-ethylidene)-2,4,5-trichloro-aniline as a yellow oil of B.P. 159–161° C./0.2 mm. Hg. The compound crystallizes out on standing.

In corresponding manner, from 2,4,6-trichloro-sulfiinyl-aniline there is obtained N-(2′,2′,2′-trichloro-ethylidene)-2,4,6-trichloro-aniline (XII$_1$) as yellow oil of B.P. 127° C./0.08 mm. Hg and of refractive index $n_D^{20}$=1.5920.

The preparation of the starting materials takes place in the same manner as stated above.

EXAMPLE 5

The sulfinylanilines described below are heated under reflux with approximately double the molar amount of anhydrous chloral until the cessation of evolution of sulfur dioxide. After the excess chloral has been distilled off, the crude reaction products crystallize out. They are recrystallized from white spirit, the corresponding N-(2,2,2-trichloro-ethylidene)-anilines being obtained in practicaly quantitative yield as pale to colorless crystals. The compounds have in each case the following data:

N-(2′,2′,2′-trichloro-ethylidene)-2,3,4,6-tetrachloro-aniline (III$_3$), M.P. 83° C.,
N-(2′,2′,2′-trichloro-ethylidene)-2,3,5,6-tetrachloro-aniline (XIII$_1$), M.P. 86° C., and
N-(2′,2′,2′,-thichloro-ethylidene)-pentachloro-aniline (IV$_2$), M.P. 94–95° C.

The preparation of the starting materials is effected as follows:

By reaction of 2,3,4,6-tetrachloro-aniline with thionyl chloride there is obtained, in practically quantitative yield, 2,3,4,6-tetrachloro-sulfinylaniline as yellow crystals of M.P. 64° C.

In the same manner, from the appropriate anilines there are obtained 2,3,5,6-tetrachloro-sulfinylaniline as yellow crystals of M.P. 68° C. and pentachloro-sulfinylaniline as yellow crystals of M.P. 128° C.

EXAMPLE 6

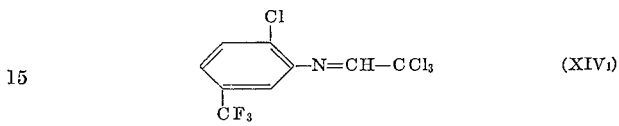

121 g. (0.5 mol) 2-chloro-5-(trifluoromethyl)-sulfinyl-aniline are heated under reflux with 150 g. anhydrous chloral until the cessation of evolution of sulfur dioxide. By distillation, 155 g. (95% of the theory) of N-(2′,2′,2′-trichloro - ethylidene) - 2 - chloro-5 - (trifluoromethyl)-aniline are obtained at a B.P. of 106° C./0.08 mm. Hg.

The sulfinylaniline is prepared in the manner described above.

EXAMPLE 7

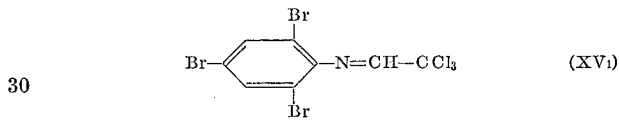

37.6 g. (0.1 mol) 2,4,6-tribromo-sulfinylaniline are heated under reflux with 30 g. anhydrous chloral for 20 hours. After the excess chloral has been distilled off, the residue is fractionated in a vacuum at 166–168° C./0.06 mm. Hg, 44 g. (96% of the theory) of a pale yellow oil, i.e., N-(2′,2′,2′ - trichloro - ethylidene) - 2,4,6 - tribromo-aniline, come over, which solidifies to give crystals of M.P. 50° C.

EXAMPLE 8

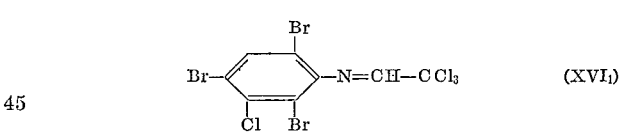

41.1 g. (0.1 mol) 2,4,6-tribromo-3-chloro-sulfinyl-aniline are heated under reflux for 30 hours with 30 g. of anhydrous chloral. The excess chloral is then distilled off in a vacuum. There remains behind a crystalline residue, which is recrystallized from white spirit. 47 g. (95% of the theory) of beige-colored crystals of N-(2′,2′,2′-trichloro-ethylidene) - 2,4,6-tribromo-3-chloro-aniline of M.P. 84° C. are obtained.

2,4,6-tribromo-3-chloro-sulfinylaniline is prepared from 2,4,6-tribromo-3-chloro-aniline and thionyl chloride in the manner which has been described several times hereinabove. Yellow crystals are obtained, M.P. 92° C.

EXAMPLE 9

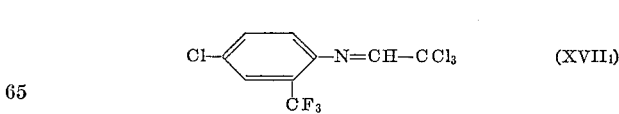

241.5 g. (1 mol) 2-(trifluoromethyl)-4-chloro-sulfinyl-aniline are heated under reflux for 6 hours with 300 g. anhydrous chloral until the cessation of evolution of sulfur dioxide. After the excess chloral has been distilled off, the residue is fractionated in a vacuum. At 98–100° C./ 0.2 mm. Hg, 266 g. (82% of the theory) of N-(2′,2′,2′-trichloro-ethylidene) - 2 - (trifluoromethyl)-4-chloro-aniline are obtained as a yellow oil ($n_D^{20}$: 1.5273).

EXAMPLE 10

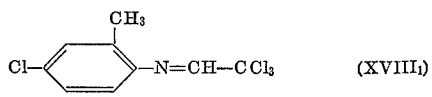

From 187.5 g. (1 mol) 2-methyl-4-chloro-sulfinylaniline there are obtained, in manner corresponding to Example 9, 170 g. (63% of the theory) of N-(2',2',2'-trichloro-ethylidene)-2-methyl-4-chloro-aniline of B.P. 110–113° C./0.25 mm. Hg ($n_D^{20}$: 1.5854).

EXAMPLE 11

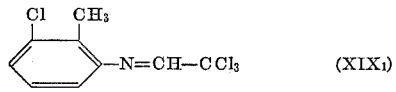

From 187.5 g. (1 mol) 2-methyl-3-chloro-sulfinylaniline there are obtained, in manner corresponding to Example 9, 153 g. (56% of the theory) of N-(2',2',2'-trichloro-ethylidene)-2-methyl-3-chloro-aniline of B.P. 130–143° C./1.0 mm. Hg (decomposition) ($n_D^{20}$: 1.5965).

EXAMPLE 12

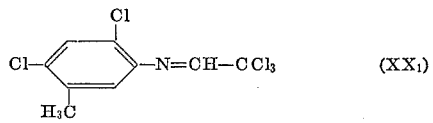

From 44.4 g. (0.2 mol) 2,4-dichloro-5-methyl-sulfinyl-aniline there are obtained, in manner corresponding to Example 9, 49 g. (81% of the theory) of N-(2',2',2'-tri-chloro-ethylidene)-2,4-dichloro-5-methyl-aniline of M.P. 89–91° C. (from benzine).

The sulfinylanilines used as starting materials are prepared in the same manner as described above.

EXAMPLE 13

Using corresponding molar amounts of chloral with each of the following sulfinylanilines, respectively, in accordance with the procedure of Example 8, as the case may be:

(a) 2,4-difluoro-sulfinylaniline;
(b) 3-fluoro-4-bromo-5-chloro-sulfinylaniline;
(c) 4-isopropyl-sulfinylaniline;
(d) 3-cyano-sulfinylaniline;
(e) 2,4-bis-(trifluoromethyl)-sulfinylaniline;
(f) 2,6-dichloro-3-cyano-4-(trifluoromethyl)-5-n-butyl-sulfinylaniline; and
(g) 2,6-dicyano-4-ethyl-sulfinylaniline;

the corresponding final compounds are produced:

(a') N-(2',2',2'-trichloro-ethylidene)-2,4-difluoro-aniline;
(b') N-(2',2',2'-trichloro-ethylidene)-3-fluoro-4-bromo-5-chloro-aniline;
(c') N-(2',2',2'-trichloro-ethylidene)-4-isopropyl-aniline;
(d') N-(2',2',2'-trichloro-ethylidene)-3-cyano-aniline;
(e') N-(2',2',2'-trichloro-ethylidene)-2,4-bis-(trifluoro-methyl)-aniline;
(f') N-(2',2',2'-trichloro-ethylidene)-2,6-dichloro-3-cy-ano-4-(trifluoromethyl)-5-n-butyl-aniline; and
(g') N-(2',2',2'-trichloro-ethylidene)-2,6-dicyano-4-ethyl-aniline.

Advantageously, in accordance with the present invention, in the foregoing formulae:

Hal represents chloro, bromo and/or fluoro;
R represents lower alkyl such as methyl, ethyl, n-propyl, iso-propyl, n-butyl, iso-butyl, sec.-butyl, tert.-butyl, and the like, especially alkyl having 1-4 carbon atoms; and/or cyano, i.e., nitrile (—CN);
$x$ is a whole number from 0 to 5, especially 1 to 5;
$y$ is a whole number from 0 to 2, especially 0 to 1; and
$z$ is a whole number from 0 to 3, especially 0 to 1;

with the proviso that the sum of $x$ and $y$ is at least 1 and at most 5, and the sum of $x$, $y$ and $z$ is at most 5.

It will be realized by the artisan that all of the foregoing compounds contemplated by the present invention possess the desired strong and selective acaricidal properties for combating acarids, as well as a comparatively low toxicity toward warm-blooded creatures and a concomitantly low phyto-toxicity, enabling such compounds to be used with correspondingly favorable compatibility with warm-blooded creatures and plants for more effective control and/or elimination of acarids by application of such compounds to such acarids and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. N-(2,2,2-trichloro-ethylidene)-aniline

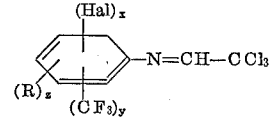

in which each Hal respectively is selected from the group consisting of chloro, bromo and fluoro, each R respectively is selected from the group consisting of lower alkyl and cyano, $x$ is a whole number from 0 to 5, $y$ is a whole number from 0 to 2, and $z$ is a whole number from 0 to 3, with the proviso that the sum of $x$ and $y$ is at least 1 and at most 5 and that the sum of $x$, $y$ and $z$ is at most 5.

2. Aniline according to claim 1 wherein each R respectively is selected from the group consisting of alkyl having 1–4 carbon atoms and cyano, $x$ is a whole number from 0 to 5, $y$ is a whole number from 0 to 1, and $z$ is a whole number from 0 to 1, with the proviso that the sum of $x$ and $y$ is at least 1 and at most 5 and that the sum of $x$, $y$ and $z$ is at most 5.

3. Aniline according to claim 1 wherein each Hal respectively is selected from the group consisting of chloro and bromo, R is alkyl having 1–4 carbon atoms, $x$ is a whole number from 1 to 5, $y$ is a whole number from 0 to 1, and $z$ is a whole number from 0 to 1, with the proviso that the sum of $x$ and $y$ is at most 5 and that the sum of $x$, $y$ and $z$ is at most 5.

4. Aniline according to claim 1 wherein Hal is chloro, $x$ is a whole number from 1 to 5, and $y$ and $z$ are 0.

5. Aniline according to claim 1 wherein such compound is N-(2',2',2'-trichloro-ethylidene)-2,3,4,6-tetra-chloro-aniline having the formula

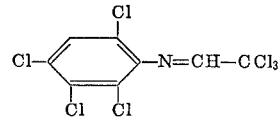

6. Aniline according to claim 1 wherein such compound is N-(2',2',2'-trichloro-ethylidene)-pentachloro-aniline having the formula

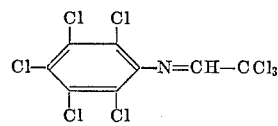

7. Aniline according to claim 1 wherein such compound is N-(2',2',2'-trichloro-ethylidene)-2,4,6-tribromo-aniline having the formula

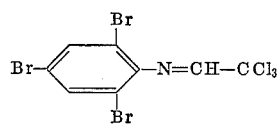

8. Aniline according to claim 1 wherein such compound is N-(2',2',2'-trichloro-ethylidene)-2,4,6-tribromo-3-chloro-aniline having the formula

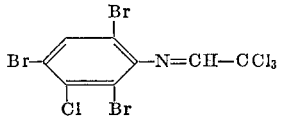

9. Aniline according to claim 1 wherein such compound is N-(2',2',2'-trichloro-ethylidene)-2-(trifluoromethyl)-4-chloro-aniline having the formula

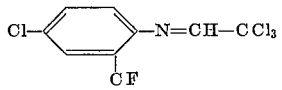

10. Aniline according to claim 1 wherein such compound is N-(2',2',2'-trichloro-ethylidene)-2-methyl-4-chloro-aniline having the formula

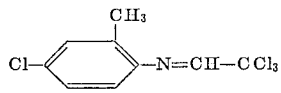

References Cited

UNITED STATES PATENTS 2,923,661   2/1960   Cavallito _____ 167—55

OTHER REFERENCES

Borrmann et al: Chem. Berichte, vol. 100, pp. 1814–1816 (1967).

Chemical Abstracts, vol. 58, 5628 (1963).

BERNARD HELFIN, Primary Examiner

G. A. SCHWARTZ, Assistant Examiner

U.S. Cl. X.R.

424—304, 325